(12) United States Patent
Rojey et al.

(10) Patent No.: US 7,846,979 B2
(45) Date of Patent: Dec. 7, 2010

(54) PROCESS FOR THE PRODUCTION OF SYNTHESIS GAS WITH CONVERSION OF CO2 INTO HYDROGEN

(75) Inventors: Alexandre Rojey, Rueil Malmaison (FR); Reynald Bonneau, Villeurbanne (FR); Nicolas Boudet, Chaponost (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 544 days.

(21) Appl. No.: 11/890,525

(22) Filed: Aug. 7, 2007

(65) Prior Publication Data
US 2009/0012188 A1 Jan. 8, 2009

(30) Foreign Application Priority Data
Aug. 8, 2006 (FR) .................. 06 07270

(51) Int. Cl.
*C07C 27/00* (2006.01)
(52) U.S. Cl. .............. 518/705; 518/700; 518/702; 518/703; 518/704
(58) Field of Classification Search .......... 518/700, 518/702, 703, 704, 705
See application file for complete search history.

(56) References Cited

U.S. PATENT DOCUMENTS

| | | |
|---|---|---|
| 5,714,657 A | 2/1998 | DeVries |
| 2004/0245086 A1 | 12/2004 | Steynberg et al. |
| 2005/0209347 A1 | 9/2005 | Bowe |

FOREIGN PATENT DOCUMENTS

| | | |
|---|---|---|
| GB | 2 168 718 A | 6/1986 |
| WO | WO 03/070629 A1 | 8/2003 |

OTHER PUBLICATIONS

Partial French Search Report issued in FR 0607270 dated Mar. 29, 2007.
H. H. Gunardson et al., "Produce Co-Rich Synthesis Gas", Petroleum Refiner, Gulf Publishing Co., vol. 78, No. 4, (1999) pp. 87-93.
Song, et al., "Technologies for direct production of flexible $H_2/CO$ synthesis gas", Energy Conversion and Management 47 (2006) - pp. 560-569, available on-line Jul. 14, 2005.

*Primary Examiner*—Jafar Parsa
(74) *Attorney, Agent, or Firm*—Millen, White, Zelano & Branigan, P.C.

(57) ABSTRACT

Process for the production of liquid hydrocarbons from a feedstock that comprises at least one elementary feedstock from the group of biomass, coal, lignite, petroleum residues, methane, and natural gas, comprising: at least one stage a) for gasification of the feedstock by partial oxidation and/or steam reforming to produce a synthesis gas SG; a stage b) for separating CO2 from SG and a portion of the effluent of the subsequent stage c); the mixing of a portion of the CO2 that is separated with a gas of an H2/CO ratio of more than 3; a stage c) for partial conversion with hydrogen, thermal or thermocatalytic, of the CO2 that is present in said first mixture according to the reaction: $CO_2+H_2 \rightarrow CO+H_2O$ in a specific reaction zone that is separated from said gasification zone or zones; a stage d) for Fisher-Tropsch synthesis on a synthesis gas that comprises at least a portion of SG and at least a portion of the CO that is produced by the conversion of CO2 into hydrogen.

11 Claims, 2 Drawing Sheets

PROCESS FOR THE PRODUCTION OF SYNTHESIS GAS WITH CONVERSION OF CO2 INTO HYDROGEN

FIELD OF THE INVENTION

The object of the invention is a process for the production of synthesis gas (gas mixture that comprises for the most part carbon oxide: CO and hydrogen: H2) from heavy carbon-containing material such as coal or lignite, heavy petroleum residues, or biomass, in particular wood or vegetable waste, and/or from light hydrocarbon feedstocks, such as primarily methane and/or ethane, for example natural gas. The synthesis gas that is obtained makes it possible to produce paraffinic or olefinic hydrocarbons that are bases of high-quality liquid fuels (high-rating diesel fraction of cetane, kerosene, etc.) or petrochemical bases, typically by means of a Fisher-Tropsch synthesis stage. It can also be used to produce oxygenated compounds, for example of methanol or dimethyl ether.

PRIOR ART

Several processes for the production of synthesis gas from carbon-containing materials, in particular steam reforming, partial oxidation and the autothermal process, are already known.

Steam reforming (known under the acronym SMR, which comes from the English "steam methane reforming" that means "reforming of methane with steam") consists of making the feedstock, typically a natural gas or light hydrocarbons, react on a catalyst in the presence of steam to obtain a synthesis gas that primarily contains, outside of steam, a mixture of carbon oxide and hydrogen. This operation is endothermic. It is carried out typically by making the steam-treated feedstock circulate in tubes that are filled with catalyst (generally a catalyst with nickel, for example comprising 6 to 25% by weight of nickel that is deposited on a substrate that comprises primarily alumina or a mixture of alumina and one or more other refractory compounds). The tubes are typically heated by radiation in tubular furnaces. This process is well suited to gaseous feedstocks, in particular to natural gas, but is incompatible with heavy carbon-containing feedstocks and contains impurities such as coal, petroleum residues or biomass (wood or other lignocellulosic compounds, vegetable waste, . . . ).

For more information that relates to the steam reforming, it is possible to refer to the general reference work A: "Conversion Processes," P. Leprince 2001, Technip Editions, Paris 15$^{ème}$, pages 455-479.

The partial oxidation, or gasification by partial oxidation (known under the acronym POX that comes from the English "partial oxidation," which means partial oxidation), consists in forming by combustion, under sub-stoichiometric conditions, a high-temperature mixing, generally between 1000° C. and 1600° C., of carbon-containing material, on the one hand, and air or oxygen, on the other hand, to oxidize the carbon-containing material and to obtain a synthesis gas. When a synthesis gas without nitrogen is sought, this process uses oxygen produced by air distillation according to conventional techniques. The POX is compatible with all forms of carbon-containing feedstocks, including heavy feedstocks.

For more information that relates to the partial oxidation, it will be possible to refer to the above-mentioned general reference work A, pages 480-491.

The autothermal process (known under the acronym ATR, which comes from the English "autothermal reformer," which means autothermal or autothermic reformer) involves a partial oxidation that is immediately followed by a catalytic steam reforming under high-temperature adiabatic conditions, for example in the range of outlet temperatures: 900° C.-1000° C. This process produces a combination in a series of two reaction modes. It consumes less oxygen than the POX process, but it requires a catalytic bed. Just like the steam reforming, it is only usable with light feedstocks and is not compatible with heavy carbon-containing materials such as coal, petroleum residues or biomass such as wood or vegetable waste. For more information that relates to the autothermal process, reference may be made to the above-mentioned general reference work A, page 495.

Accordingly, the sole known process for the production of synthesis gas that is well suited to heavy carbon-containing materials that are typically loaded with heteroatoms such as metals (Ni, V) and/or N, O, S is partial oxidation or POX. This POX process, typically carried out with oxygen and under pressure, makes it possible to readily produce synthesis gases that are suited to the desired syntheses downstream.

The desired H2/CO ratio may vary according to the desired synthesis and/or the catalyst that is used. This ratio is different, for example, according to whether an iron catalyst or, alternately, a cobalt catalyst is used during the synthesis of waxes and other hydrocarbons for the final production of diesel bases.

By extension and by definition according to the invention, any operation for transformation into synthesis gas of a heavy feedstock (biomass, coal, lignite, petroleum residue, . . . ) and/or a light hydrocarbon feedstock (methane, natural gas and/or recycled gas, liquefied petroleum gas: C3, C4 or C3/C4 (whereby Cn designates a hydrocarbon fraction that has n carbon atoms) will be called by the term "gasification" below.

Before carrying out the Fischer-Tropsch synthesis, it is necessary to eliminate essentially all of the sulfur-containing and nitrogen-containing compounds from the synthesis gas that is obtained. The purification treatments are described in particular in the above-mentioned general reference work A, pages 480-491 and 575-593.

The separation of H2S and CO2 is conventionally carried out by scrubbing gas by an aqueous amine solution, for example monoethanolamine (MEA) or methyldiethanolamine (MDEA) as described in the above-mentioned general reference work A, pages 468-471, or in the reference work B: "Gas Purification," 2$^{nd}$ Edition, F. C. Riesenfeld and A; L. Kohl Gulf Publishing Company; Houston (Purification of Gases), pages 22 to 81. An option that is sometimes used consists in first carrying out on the synthesis gas—after condensation of water—a conversion of the sulfur-containing compounds into H2S, in particular on a catalyst with chromium on alumina or with copper/chromium on alumina, as described on pages 626-627 in the general reference work B. It is also possible to use a conversion shift catalyst (steam conversion) based on iron oxide and chromium oxide as described in this work, page 634. A final treatment on activated carbon as described in this work, page 633, finally can be used downstream from the scrubbing with amines to remove traces of residual impurities.

If an extreme purity of the synthesis gas is desired, it is also possible to use—instead of scrubbing with amines—a purification with scrubbing with cooled methanol, for example according to the Rectisol process that uses two stages for the elimination of COS and H2S, then CO2, as described in the above-mentioned general reference work A, pages 488 and 489, and in the above-mentioned general reference work B, pages 691 to 700. Other options that use molecular sieves (adsorption with pressure variation, called PSA or a catalytic conversion on zinc oxide) can also be used during the purification of the synthesis gas.

The purification that is carried out typically makes it possible to eliminate nearly all of the impurities, for example to less than 0.1 ppmv of sulfur and likewise for the nitrogen-containing compounds such as HCN.

The synthesis gas that is produced is typically transformed into primarily liquid hydrocarbons by Fischer-Tropsch synthesis.

The Fischer-Tropsch conversion stage can be carried out, according to the invention, according to any of the known processes, using any of the known catalysts, in particular based on iron or cobalt, and is not limited to a particular process or catalyst. It is carried out with a catalyst that is suitable for the H2/CO ratio of the synthesis gas, for example a catalyst with cobalt for a synthesis gas of the H2/CO ratio of between about 1.8 and 2.5 or else an iron catalyst for a synthesis gas of the H2/CO ratio of between about 1.2 and 2.

It is possible to use a three-phase fixed-bed reactor or a three-phase suspension reactor (called "slurry" in English), i.e., a three-phase reactor with a liquid phase that comprises a solid catalyst that is divided in suspension in the liquid and a gaseous phase (synthesis gas) that is injected into the suspension, typically under turbulent conditions. In general, in such a three-phase suspension reactor, a Fischer-Tropsch catalyst is used in the form of fine particles that comprise an inert substrate that is impregnated with iron or cobalt. It is possible, for example, to use a substrate of alumina or silica, or zirconia, or silica-alumina, or alumina-zirconia, impregnated by 10% to 30% by weight of iron or cobalt relative to the overall catalyst. The catalyst can comprise particles with a mean diameter of between 3 and 150 micrometers, preferably 10 to 120 micrometers, in suspension in a liquid that consists essentially of products of the reaction, in particular paraffinic waxes that are melted at the reaction temperature. A percentage weight of catalyst generally can be encompassed between 10% and 40% by weight relative to the liquid/solid catalyst suspension. The gas superficial velocity in the reactor can be between 0.05 m/s and 0.4 m/s, in particular between 0.12 and 0.3 m/s. The pressure is often between 1.5 and 4 MPa, in particular between 1.8 and 2.8 MPa. The temperature is often between 215° C. and 255° C., in general between 230° C. and 240° C. For more details that relate to the catalysts and/or Fischer-Tropsch processes, it is possible in particular to refer to the patents or patent applications: EP 450 860; U.S. Pat. No. 5,961,933; U.S. Pat. No. 6,060,524; U.S. Pat. No. 6,921,778; PCT/FR05/02.863.

The Fischer-Tropsch synthesis industrial processes that are among the highest-performing typically use catalysts that are based on cobalt and require an H2/CO ratio in the synthesis gas that is close to 2, often between 1.8 and 2.5, and preferably close to 2.15. This type of process maximizes the production of long-chain hydrocarbons in the form of long paraffins, in particular waxes, while reducing the production of light effluents. The heavy products and waxes that are thus obtained are then sent to a hydrocracking unit that makes it possible to transform them into liquid fuels, diesel fuel and kerosene. This unit is also fed by middle distillates (liquid distillates with a boiling point of more than 150° C.), which are typically hydroisomerized. For more information that relates to hydrocracking, it will be possible to refer to the general referenced work A, pages 334-362.

When the Fischer-Tropsch catalyst is based on iron, it is possible to use the H2/CO ratios that are typically between 0.8 and 2 and generally between 1.2 and 1.8.

One skilled in the art, based on the heavy and/or light feedstocks that he uses, therefore seeks to obtain a synthesis gas of the H2/CO ratio that is compatible with the Fischer-Tropsch catalyst that is used. When this H2/CO ratio is too low, which is typically the case when heavy feedstocks are gasified, it is known in the prior art to be able to increase it by partial conversion of CO with H2, according to the so-called reaction of "gas to water," also known under the English name of "water gas shift," or "WGS" or "shift," which operates according to the balanced reaction: $CO+H_2O \rightarrow CO_2+H_2$.

This stage makes it possible to reduce the number of moles of CO and to increase the number of moles of hydrogen that are present in the mixture. However, this transformation of CO into CO2 reduces the amount of CO that can be converted into hydrocarbons by Fischer-Tropsch synthesis, in particular into liquid hydrocarbons. Another object, however, is to maximize the production of liquid products from a given feedstock.

It is therefore desirable to improve the performance levels of the processes for generating synthesis gas and of the POX process in particular, applied particularly from the point of view of the overall energy efficiency so as to better upgrade the feedstock or feedstocks by increasing the "carbon yield," i.e., the amount of liquid hydrocarbons that can be produced from a given amount of heavy carbon-containing material. It is also important to find a new energy system that upgrades these carbon-containing materials and that sends less CO2 into the atmosphere.

One object of the process according to the invention is to meet at least one or even all of these objectives. Upon further study of the specification to appended claims, other objects and advantages will become apparent.

The invention also makes it possible to achieve these objects with a reliable and simple installation that can take advantage of intense thermal integration.

SUMMARY DEFINITION OF THE INVENTION

To achieve the above-mentioned object or objects, the process according to the invention uses—in combination with at least one stage for producing synthesis gas in at least one gasification zone according to at least one of the known gasification processes—a stage for separating CO2 from the final synthesis gas or an intermediate synthesis gas, the mixture of a fraction of at least the CO2 that is recovered with an additional hydrogen-rich gas with an H2/CO ratio of more than 3, or even with pure hydrogen, and the passage of the thus formed mixture into a zone for partial conversion of CO2 with hydrogen, i.e., conversion of CO2 into CO in the presence of hydrogen, according to the balanced reaction $CO_2+H_2 \rightarrow CO+H_2O$, which is enhanced by high temperatures, whereby this conversion zone is at least partly separate from the gasification zone. This reaction for converting CO2 with hydrogen is the inverse reaction of the above-mentioned so-called "gas-to-water" reaction, and it is also known under the English name "reverse water gas shift," or "RWGS" or "reverse shift."

According to the invention, this reaction for converting CO2 with hydrogen is implemented in a reactor or at least a specific reaction zone. It is therefore not a matter of simply recycling CO2 at the inlet of a gasification reactor, for example, a partial oxidation reactor. The conversion of CO2 with hydrogen in a specific conversion zone advantageously makes it possible to operate under conditions where the progress of the reaction occurs in the desired sense and/or to recover the energy in an amount that is suitable on the effluents or the gasification effluents and to use this energy in the specific reaction zone.

According to the invention, at least a portion of the CO2 that is produced during the gasification is therefore recovered, and at least a portion of the recovered CO2 is converted into CO. This makes it possible, downstream, to convert at least a portion of the CO that is obtained from the recovered CO2 into liquid hydrocarbons by Fischer-Tropsch synthesis, which improves the carbon yield.

Owing to the recovery of CO2, preferably and in particular of CO2 on the final synthesis gas, it is also possible, according to the invention, to carry out only a limited conversion of the CO2 with hydrogen, at a temperature that is lower than the maximum temperature that is implemented for the gasification. The unconverted CO2 is then actually itself also recovered and can be at least partially recycled to increase its conversion into CO.

The use of a relatively low reaction temperature makes it possible to be able to recover at least a portion of the energy that is necessary to the preheating and to the endothermic reaction for converting CO2 with hydrogen on the hotter gasification effluents, in particular on the effluents of highest temperature when there are several effluents.

The invention therefore makes it possible to obtain a higher carbon yield and typically improved energy integration. It can be implemented both from light feedstocks such as natural gas and from heavy feedstocks such as biomass, in particular lignocellulosic biomass, petroleum residues, coal, or else from mixtures of light and heavy feedstocks.

A hydrogen-rich stream is necessary, however, in the conversion of CO2. This stream can be provided externally; for example, it can consist of the hydrogen that is produced by electrolysis of the water. It can also come from or be constituted by a light feedstock steam-reforming effluent, for example methane, ethane and/or natural gas, whose H2/CO ratio exceeds 3 and most often 4.

DETAILED DESCRIPTION OF THE INVENTION

To achieve these objects, a process for producing liquid hydrocarbons from a feedstock that comprises at least one elementary feedstock from the group that is formed by biomass, coal, lignite, petroleum residues that boil essentially above 340° C., methane, and natural gas is thus proposed, whereby this process comprises at least:

a stage a) for gasification of said feedstock by partial oxidation in the presence of oxygen and/or steam reforming, in a gasification or a zone for gasification, for the production of a synthesis gas (SG) effluent;

a stage b) for separating CO2 from SG, and/or at least a portion of the effluent of the subsequent stage c);

a stage for mixing at least a portion of the CO2 that is separated with a gas having an H2/CO ratio that is more than 3 and that belongs to the group that is formed by: on the one hand, a gaseous effluent for steam reforming of methane or natural gas, and, on the other hand, hydrogen that is produced by electrolysis of water, as well as by the mixtures that are obtained from these two sources, to obtain a first mixture that comprises CO2 and hydrogen;

a stage c) for partial conversion with hydrogen, thermal or thermocatalytic, of the CO2 that is present in said first mixture according to the reaction: $CO_2+H_2 \rightarrow CO+H_2O$ in a specific reaction zone that is separated from said gasification zone;

a stage d) for Fischer-Tropsch synthesis of hydrocarbons that have for the most part at least 5 carbon atoms from a synthesis gas that comprises at least a portion of the effluents of stage c).

The selection of the origin of the gas with an H2/CO ratio of more than 3 to which CO2 is added is particularly advantageous according to the invention: A steam-reforming effluent of light feedstock that comprises primarily methane and/or natural gas makes it possible to obtain a hydrogen source that is very low in CO, generally with an H2/CO ratio of between 4 and 8.

According to a first variant, this steam-reforming effluent of a light feedstock may not be cooled and may have a temperature of more than 750° C. Preheated CO2 is then added typically at least 250° C., and preferably at least 400° C. to obtain the first mixture, and this first mixture is injected into the effluent SG that typically is found at a temperature of between 1250° C. and 1600° C. to obtain a second mixture at a temperature that is generally between 900° C. and 1200° C. that is subjected to stage c) for the partial conversion reaction with hydrogen, thermal or thermocatalytic, of the CO2 that is present in this mixture according to the reaction: $CO_2+H_2 \rightarrow CO+H_2O$ in an adiabatic reaction zone.

When the feedstock of the gasification stage a) is a light feedstock that primarily comprises methane and/or natural gas, it is possible to carry out the stage c) on a catalyst that comprises nickel at an outlet temperature of between 900° C. and 1100° C. Then, both the additional steam reforming of the unreacted fraction of the steam-reforming effluent that is contained in the first mixture and a conversion with hydrogen of the CO2 that is contained in the second mixture are carried out.

It is also possible to carry out stage c) without a catalyst, in a purely thermal way, at an outlet temperature of between 1050° C. and 1200° C.

According to a second variant, the gas with an H2/CO ratio that is more than 3 comprises a steam-reforming effluent of a light feedstock that primarily comprises methane and/or natural gas that has been cooled to condense at least a portion of the water that is contained in this effluent. The reduced water level makes it possible to shift the equilibrium of the conversion of the CO2 with hydrogen toward the production of Co.

According to another variant of the invention, which can be used alone or in combination with the above-mentioned variants, an electrolysis of water is carried out to produce hydrogen and oxygen; at least a portion of the hydrogen that is produced is used to compose said gas with an H2/CO ratio of more than 3; and at least a portion of the oxygen is used for gasification stage a). Thus, thanks to using an electrolyzer, two simultaneous functions are achieved: the production of hydrogen to shift the equilibrium of the reaction of stage c) toward the production of CO, and, in contrast, providing oxygen for the partial oxidation of stage a).

The feedstock of stage a) may be very varied and comprise both a light feedstock that comprises primarily methane and a heavy feedstock that comprises coal and/or lignite and/or lignocellulosic biomass and/or a petroleum residue. When a heavy feedstock is used, stage c) is typically carried out either catalytically—and in this case without contact with the partial oxidation effluents of stage a)—or thermally at a high temperature of between 1050° C. and 1200° C. at the outlet of stage c), and in this case, it is possible to use the mixture with the partial oxidation effluents to supply the necessary heat because there is no catalyst that is incompatible with sulfur-containing products and/or carbon deposits.

The gas with an H2/CO ratio of more than 3 may comprise a steam-reforming effluent of a light feedstock, hydrogen from electrolysis, or a mixture of gases obtained from these two sources.

The process makes it possible to convert the CO2 first into CO (stage c)) and then into liquid hydrocarbons (stage d)). This increases the carbon yield.

Whereby stage c) for conversion of CO2 with hydrogen is endothermic, it is possible either to supply the necessary heat by high-temperature mixing with the partial oxidation effluents or to supply heat by, for example, using a reactor-exchanger, with heating of the reaction medium by another fluid. As a heating fluid, it is possible to use high-temperature flue gases (combustion gas) or else, preferably, a gasification effluent (steam reforming or an autothermal or partial oxidation process (POX)), which also exits at high temperature.

Thus, a useful thermal recovery on the gasification effluent is carried out. This recovery is made all the easier provided that the outlet temperature of stage c) is particularly less than the outlet temperature of gasification.

According to the other variant embodiment of the invention, stage c) is carried out by injecting the first mixture, preferably preheated (in particular by indirect exchange with the effluent of stage c)), in the gasification effluent of stage a), to obtain a second mixture that reacts in an adiabatic way in the absence of catalyst, or optionally on a catalyst with nickel if the feedstock is light and free of sulfur. It is thus possible to take advantage of direct heat input of the gasification effluent, typically at the highest temperature.

Often, the gasification effluent of stage a) is an effluent of partial oxidation with oxygen from a carbon-containing feedstock, with a temperature of between 125° C. and 1600° C. The temperature of the second mixture at the end of stage c) is generally less than 80° C. to 300° C., namely 400° C., and often 120° C. to 250° C. with that of the gasification effluent into which is injected the mixture, but it generally remains greater than 950° C. and even 1000° C.

DETAILED DESCRIPTION OF DRAWINGS

Figure 1:
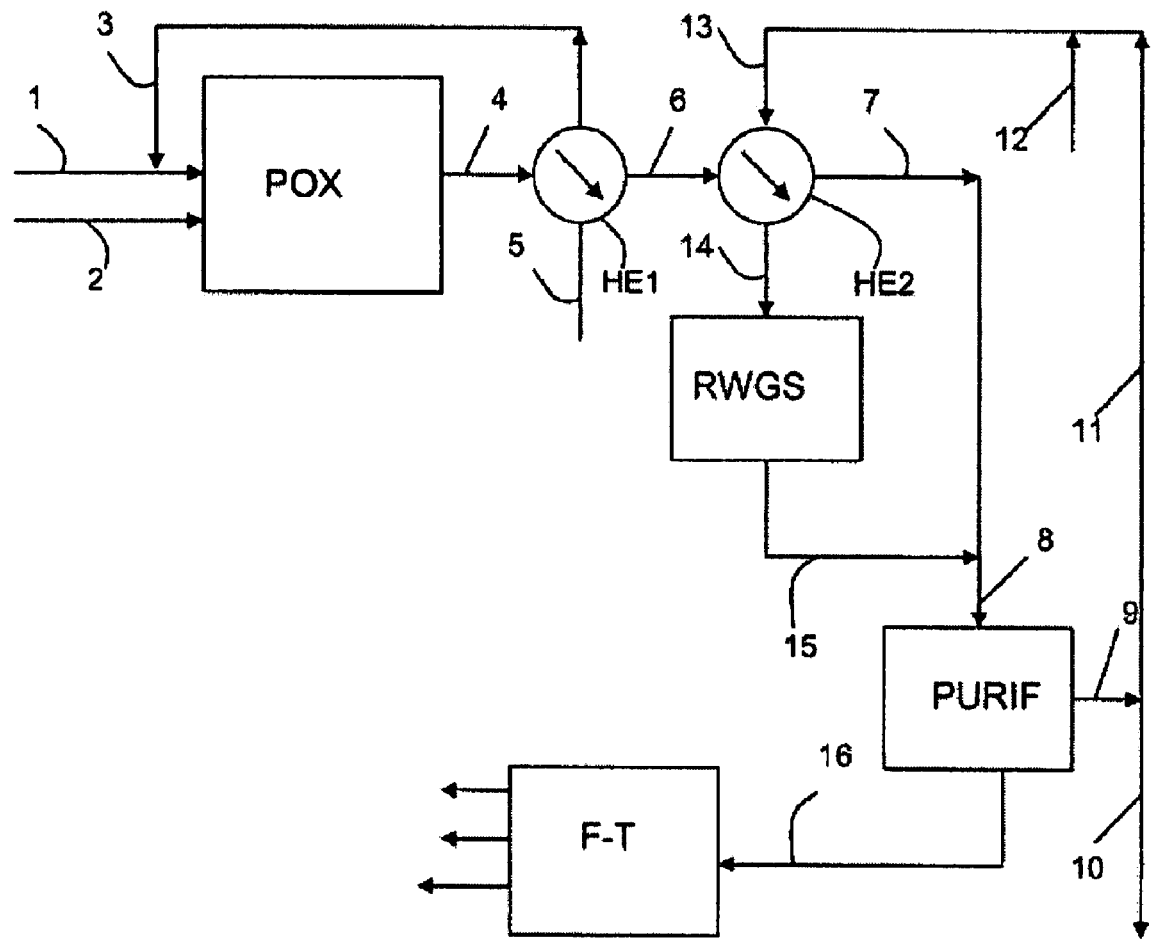
FIG. 1 is a simplified block flowsheet of an installation for the implementation of the process according to the invention, comprising a CO2 catalytic conversion unit with hydrogen.

Reference is now made to FIG. 1 that shows an installation that comprises a unit for catalytic conversion of CO2 with hydrogen, separated and independent of the gasification unit, i.e., without there being direct contact between the first mixture (of recovered CO2 and a hydrogen-rich gas) and the gasification effluents.

The feedstock is, for example, of dried lignocellulosic biomass (such as wood), optionally pyrolyzed by heating between 300° C. and 650° C., typically for 0.5 second for several minutes according to the temperature that is used, then ground finely in the form of particles of mean dimensions of between 10 and 200 micrometers and preferably between 20 and 100 micrometers. The feedstock can also be coal powder or else a light feedstock such as purified natural gas or methane.

The feedstock is fed into a partial oxidation unit (POX) via line 1, to be gasified there in the presence of superheated steam that is fed via line 3 and oxygen that is fed via line 2. The pressure that is used for the partial oxidation is often between 0.1 and 12 MPa, most often between 1 and 8 MPa, and typically between 1.5 and 5 MPa. The amount of oxygen is adjusted to obtain a partial oxidation with an outlet temperature that is often between 1200° C. and 1700° C., most often between 1300° C. and 1600° C., and preferably between 1320° C. and 1480° C. The residence time is also adjusted to obtain an essentially total gasification of this biomass, primarily of H2, CO, CO2 and H2O. The typical residence times are on the order of a second.

Via the line 4, the partial oxidation effluent feeds a quenching exchanger (HE1) for its cooling and the production of typically superheated steam from liquid water that is fed via line 5. At the outlet of the exchanger (HE1), the effluent circulates in the line 6 and passes through a second heat exchanger: (HE2) for reheating the feedstock of the unit for conversion of CO2 with hydrogen (RWGS). The cooled effluent circulates in the line 7, is mixed with the effluent of the unit for conversion of CO2 with hydrogen then rejoins, via the line 8, a purification unit (PURIF) in which all the impurities are essentially eliminated to leave only a mixture of CO and H2 that is essentially free in particular of sulfur-containing and nitrogen-containing compounds, such as H2S, HCN, etc., which could deactivate the catalyst of the Fischer-Tropsch unit: (F-T) downstream. In particular, CO2 is separated, evacuated via the line 9, which is divided into a first flow of excess CO2 evacuated via the line 10 and a second flow that circulates in the line 11 to be recycled to the unit for conversion of CO2 with hydrogen (RWGS). The separation of the CO2 is conventionally carried out by scrubbing gas by an aqueous amine solution, for example methyldiethanolamine (MDEA) as described in the above-mentioned general reference work A. It is also possible, if the partial oxidation feedstock contains sulfur, to use a purification with scrubbing with cooled methanol, for example according to the Rectisol process that uses two stages for the elimination of COS and H2S, then CO2, as described in this same general work A, pages 488 and 489.

The flow of recycled CO2 is mixed with a hydrogen-rich gas that is fed via the line 12, and the thus formed mixture or "first mixture" rejoins the heat exchanger (HE2) via the line 13, or this first mixture is heated to a temperature that is typically between 400° C. and 700° C., for example between 500° C. and 560° C. The first mixture, thus heated to a relatively high temperature, constitutes the feedstock of the unit (RWGS) for conversion of CO2 with hydrogen, fed via the line 14. In this unit (RWGS), the reaction for conversion of CO2 is carried out in an adiabatic manner on a fixed-bed catalyst. It is possible to use any known catalyst for conversion of CO2 with hydrogen, for example a bulk catalyst, typically with iron oxide (80%-95%) and with chromium oxide (5%-10% by weight). To obtain a high conversion of CO2, it is possible to use significant excess hydrogen and to send a feedstock that comprises only very little steam.

The effluent of the unit (RWGS) for conversion of CO2 with hydrogen circulates in the line 15, then is mixed with the cooled effluent of partial oxidation (POX) that is obtained from the heat exchanger (HE2) and that circulates in the line 7, then the mixture is sent to the gas purification unit (PURIF) via the line 8.

The purified synthesis gas then feeds, via the line 16, a Fischer-Tropsch synthesis unit (F-T), for example a unit for synthesis in a three-phase fixed bed or in a three-phase bed in suspension, on catalyst with cobalt or with iron. After hydrocracking of middle distillates, this unit typically produces heavy products and waxes, kerosene, diesel fuel with a high cetane rating, and minor amounts of naphtha and liquefied petroleum gas (C3/C4).

The carbon balance is improved relative to an installation that is lacking in a unit (RWGS) for conversion of CO2 with hydrogen, whereby a portion of the separated CO2 is converted into CO and then finally into liquid hydrocarbons.

Figure 2:
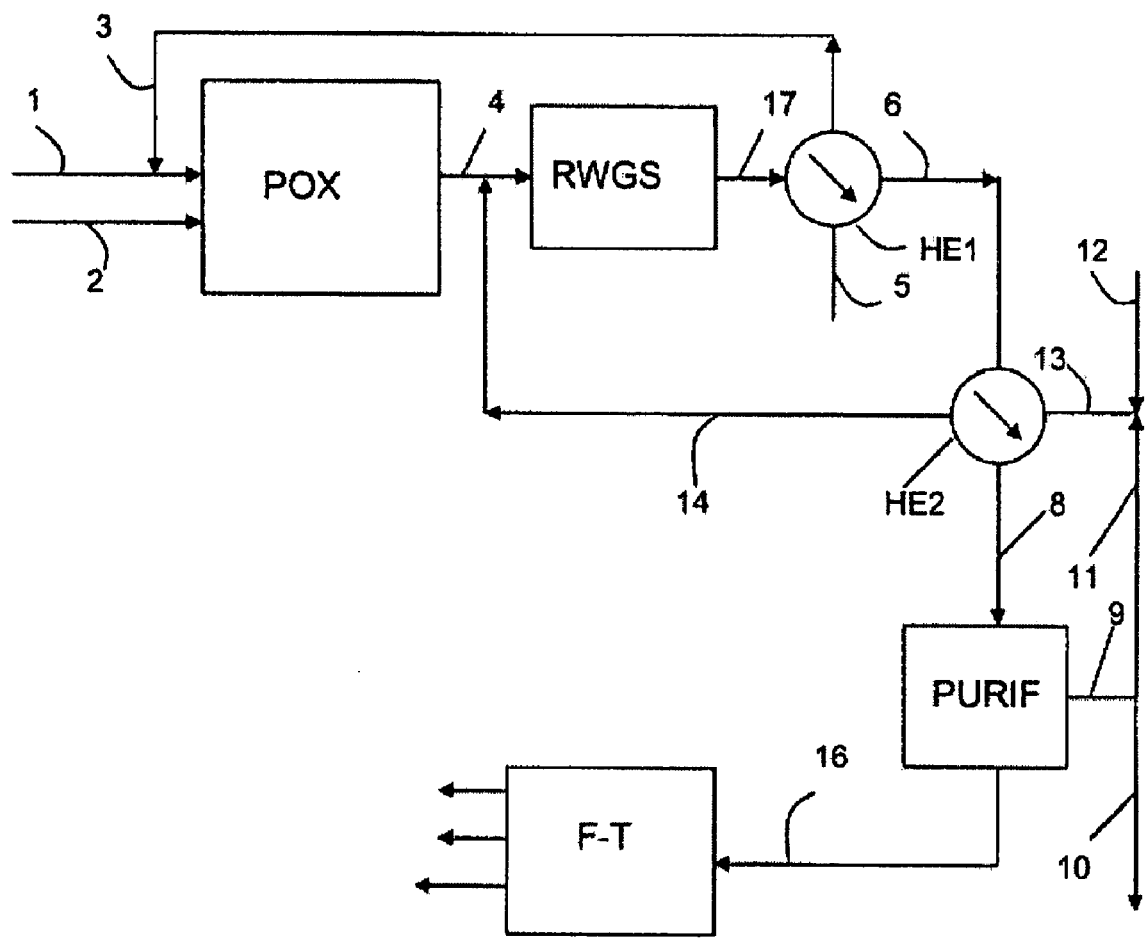
FIG. 2 is a simplified block flowsheet of another installation for the implementation of the process according to the invention, comprising a unit for high-temperature thermal conversion of CO2 into hydrogen.

Reference is now made to FIG. 2, which shows a second installation variant: here, a unit (RWGS) for conversion of CO2 with hydrogen that is purely thermal (and no longer catalytic) is used. In contrast, it operates at a very high outlet temperature, generally above 1000° C., and most often from about 1050° C. to 1200° C. To obtain a "second mixture," this high temperature is obtained by direct mixing of the "first mixture" (of CO2 and a hydrogen-rich gas) with the effluents at very high temperature (such as about 1400° C.) of the partial oxidation unit POX. The temperature of mixing the partial oxidation effluent, which is about 1400° C., is even higher than the outlet temperature, whereby the endothermic reaction takes place in an adiabatic manner with a drop in temperature.

The RWGS unit for conversion of CO2 with hydrogen is therefore fed, via the line 17, not by the "first mixture" but by the "second mixture" that comprises the effluents of the unit (POX). Relative to the installation of FIG. 1, the unit (RWGS) is therefore inserted between the unit (POX) and the first heat exchanger (HE1) for the generation of steam. The remainder of the installation is identical and uses the same reference numbers. The very high temperatures that are used in this variant of the process according to the invention make it possible to obtain an adequate conversion of CO2 into CO even in the absence of catalyst.

The two variants of the invention that are described are the two preferred embodiments of the invention. The first variant operates at moderate temperature but requires the use of a catalyst, whereas the second variant does not require catalyst but operates at a very high temperature.

EXAMPLES

Example 1

According to the Prior Art

A non-dehydrated wood feedstock, with a flow rate of 30,000 kg/h including 18,000 kg/h of dry material, is used. The wood, ground in the form of fine particles of 100 micrometers or less is sent directly to the partial oxidation unit (POX), also fed by 14,603 kg/h of oxygen. The output effluent of the partial oxidation is a synthesis gas that has a molar ratio $H_2/CO=0.79$, with a flow rate of 44,603 kg/h, a temperature of 1,400° C., and under a pressure of 2.9 MPa. This gas is cooled, then mixed at 1,053 kg/h of external hydrogen produced by an electrolyzer, to produce 45,656 kg/h of synthesis gas including 12,435 kg/h of an $H_2+CO$ mixture with an $H_2/CO$ molar ratio=2.15.

The electrolyzer is fed by 16,443 kg/h of water and consumes an electric power of 92 MW. It produces 14,603 kg/h of oxygen, integrally consumed by the partial oxidation unit (POX), and 1,840 kg/h of hydrogen, including 1,053 kg/h, is added to the synthesis gas, and 787 kg/h is produced in excess.

The compositions of the partial oxidation (POX) output synthesis gas after the addition of hydrogen are as follows:

| Composition | POX Output | After the Addition of $H_2$ |
| --- | --- | --- |
| $H_2$ (% by Volume) | 15.1 | 32.5 |
| Co (% by Volume) | 19 | 15.1 |
| $H_2O$ (% by Volume) | 48.3 | 38.5 |
| $CO_2$ (% by Volume) | 17.6 | 13.9 |
| $H_2/CO$ (mol/mol) | 0.79 | 2.15 |

The synthesis gas that contains the desired $H_2/CO$ ratio then undergoes a scrubbing with amines that typically makes it possible to eliminate 90% of the $CO_2$ that is present thus to recover a flow of 14,044 kg/h of $CO_2$, and a synthesis gas of the H2/CO ratio=2.15 that is well adapted to a Fischer-Tropsch synthesis on catalyst with cobalt.

By this Fischer-Tropsch synthesis and then a hydrocracking of the hydrocarbons boiling above 150° C. and contained in the effluents, there are obtained:

1,440 kg/h of naphtha (C5-C9 fraction)

2,487 kg/h of kerosene+gas oil (C10+ fraction), whereby the balance is formed by light hydrocarbons C1-C4 and the unconverted synthesis gas H2/CO/CO2, H2O.

A material yield of C5+(naphtha+kerosene+gas oil) is obtained relative to the dry material of the biomass with an origin of 21.8% per unit of mass.

Example 2

According to the Invention

This example takes on the conditions of Example 1 by adding the following improvement thereto: the hydrogen that is produced in excess by the electrolyzer and a portion of the $CO_2$ that is produced by the scrubbing with amines are mixed to feed a separate reactor for conversion of CO2 with hydrogen (RWGS) so as to produce a mixture of additional $CO+H_2$, by the balanced reaction: $CO_2+H_2 \leftrightarrows CO+H_2O$. The remainder of CO2 that is not recycled is purged into the atmosphere.

The conversion of CO2 with hydrogen being endothermic, it is necessary to heat the feedstock and optionally also the reactor of the unit (RWGS).

Whereby the conversion of the CO2 is promoted by a high temperature, it is possible to select the outlet temperature of the reactor so as to obtain at the outlet the desired conversion. The reactor can advantageously be a reactor-exchanger that is heated by, for example, the hot synthesis gas that is obtained from the partial oxidation (POX).

It is also possible to select the outlet temperature of the reactor of the unit (RWGS) so that the effluent has an $H_2/CO$ molar ratio=2.15. The effluent of the reactor can then be mixed with synthesis gas, thus to form a total flow of $H_2+CO$ that always has an $H_2/CO$ ratio of 2.15. This total flow then feeds the scrubbing with amines that typically makes it possible to eliminate 90% of the $CO_2$ that is present.

By using an RWGS unit for conversion of CO2 with hydrogen with a catalyst of iron oxide and chromium oxide, operating under a pressure of 2.7 MPa with an outlet temperature of 460° C., the following results are obtained:

| | Total Scrubbing Input Flow to Amines | Total Scrubbing CO₂ Output To Amines | CO₂ to RWGS | RWGS Effluent | Synthesis Gas F-T (Before Elimination of Water) |
|---|---|---|---|---|---|
| Flow Rate (kg/h) | 71,852 | 32,010 | 25,409 | 26,196 | 39,842 |
| H₂ (% by Volume) | 31.1 | — | — | 27.5 | 39.3 |
| CO (% by Volume) | 14.5 | — | — | 12.8 | 18.2 |
| H₂O (% by Volume) | 31.4 | — | — | 12.8 | 39.6 |
| CO₂ (% by Volume) | 23 | ≈100 | ≈100 | 46.9 | 2.9 |
| H₂/CO (mol/mol) | 2.15 | — | — | 2.15 | 2.15 |

By Fischer-Tropsch synthesis, then hydrocracking of hydrocarbons that boil above 150° C. and are contained in the effluents, there are obtained:

1,794 kg/h of naphtha (C5-C9 fraction)
3,287 kg/h of kerosene+gas oil (C10+ fraction), whereby the balance is formed by light hydrocarbons C1-C4 and unconverted synthesis gas H2/CO/CO2, H2O.

A material yield of C5+(naphtha+kerosene+gas oil) is therefore obtained relative to the dry material of the biomass with an origin of 28.2% per unit of mass or a yield that is significantly higher than that of the prior art.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/07.270, filed Aug. 8, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for producing liquid hydrocarbons from a feedstock that comprises at least one elementary feedstock from the group of biomass, coal, lignite, petroleum residues that boil essentially above 340° C., methane, and natural gas, said process comprising at least:
   a stage a) for gasification of said feedstock by partial oxidation in the presence of oxygen and/or steam reforming, in a gasification or zone of gasification, for the production of CO2 and a synthesis gas (SG) effluent comprising $H_2$ and CO;
   a stage b) for separating CO2 from SG, and/or at least a portion of the effluent of the subsequent stage c);
   a stage for mixing at least a portion of the CO2 that is separated with a gas with an H2/CO ratio that is more than 3 and is derived from at least one of (A) a gaseous effluent from steam reforming of methane or natural gas, and (B) hydrogen that is produced by electrolysis of water, as well as by mixtures thereof, to obtain a first mixture that comprises CO2 and hydrogen;
   a stage c) for partial conversion with hydrogen, thermal or thermocatalytic, of the CO2 present in said first mixture according to the reaction: CO2+H2→CO+H2O in a specific reaction zone that is separated from said gasification zone;
   a stage d) for Fischer-Tropsch synthesis of hydrocarbons that have mostly at least 5 carbon atoms from a synthesis gas that comprises at least a portion of effluents of stage c).

2. A process according to claim 1, in which said gas with an H2/CO ratio of more than 3 comprises an effluent from steam reforming of a light feedstock that primarily comprises methane and/or natural gas.

3. A process according to claim 2, in which said gas with an H2/CO ratio of more than 3 comprises an uncooled effluent from steam reforming of a light feedstock that comprises primarily methane and/or natural gas, at a temperature of more than 750° C., to which CO2 that is preheated to at least 250° C. is added to obtain said first mixture, and said first mixture is injected into effluent SG that is at a temperature of between 1250° C. and 1600° C. to obtain a second mixture at a temperature of between 900° C. and 1200° C. that is subjected to stage c) for the thermal or thermocatalytic reaction of partial conversion with hydrogen of the CO2 that is present in this mixture according to the reaction: CO2+H2→CO+H2O in an adiabatic reaction zone.

4. A process according to claim 3, in which the feedstock of the gasification stage a) is a light feedstock that primarily comprises methane and/or natural gas, and the stage c) is carried out on a catalyst that comprises nickel at an outlet temperature of between 900° C. and 1100° C.

5. A process according to claim 3, in which stage c) is carried out without a catalyst, at an outlet temperature of between 1050° C. and 1200° C.

6. A process according to claim 1, in which said gas with an H2/CO ratio of more than 3 comprises a steam-reforming effluent of a light feedstock that primarily comprises methane and/or natural gas and that has been cooled to condense at least a portion of the water that is contained in this effluent.

7. A process according to claim 1, in which an electrolysis of water is carried out to produce hydrogen and oxygen; at least a portion of the hydrogen that is produced is used to compose said gas with an H2/CO ratio of more than 3, and at least a portion of the oxygen is used for the gasification stage a).

8. A process according to claim 2, in which said feedstock comprises both a light feedstock that comprises primarily methane, and a heavy feedstock that comprises coal and/or lignite and/or the lignocellulosic biomass and/or a petroleum residue.

9. A process according to claim 2, in which said gas with an H2/CO ratio of more than 3 comprises a steam-reforming effluent of a light feedstock that primarily comprises methane and/or natural gas and that has been cooled to condense at least a portion of the water that is contained in this effluent.

10. A process according to claim 3, in which said feedstock comprises both a light feedstock that comprises primarily methane, and a heavy feedstock that comprises coal and/or lignite and/or the lignocellulosic biomass and/or a petroleum residue.

11. A process according to claim 5, in which said feedstock comprises both a light feedstock that comprises primarily methane, and a heavy feedstock that comprises coal and/or lignite and/or the lignocellulosic biomass and/or a petroleum residue.

* * * * *